United States Patent
Flory et al.

[11] 3,838,718
[45] Oct. 1, 1974

[54] MULTI-PRODUCT SWIVEL JOINT

[75] Inventors: John F. Flory, Morristown; Raymond A. Beazley, West Caldwell, both of N.J.; Kristen I. Pedersen, Scarsdale, N.Y.

[73] Assignee: Esso Research and Engineering Company, Linden, N.J.

[22] Filed: Jan. 2, 1973

[21] Appl. No.: 320,053

[52] U.S. Cl. .................. 141/100, 9/8 P, 141/285, 141/387, 285/136, 285/190
[51] Int. Cl. ............................................ B65b 3/04
[58] Field of Search .................. 9/8 P; 61/46, 46.5; 141/387, 388, 286, 310, 382, 392, 284, 285, 100, 279; 214/13, 14; 285/131, 136, 190

[56] References Cited
UNITED STATES PATENTS
3,082,440  3/1963  Rhedin ................................. 9/8 P
3,430,670  3/1969  Hopkins .......................... 285/136 X
3,648,311  3/1972  Voss ............................... 141/387 X Primary Examiner—Houston S. Bell, Jr.
Assistant Examiner—Frederick R. Schmidt
Attorney, Agent, or Firm—F. Donald Paris

[57] ABSTRACT

A multi-product fluid swivel assembly for handling more than one cargo flow at a time, for use in single anchor leg mooring systems where deballasting to shore is required, where bunkering is desired, or where it is desired to handle more than one product simultaneously. The fluid swivel assembly includes a plurality of concentric passageways for handling simultaneous fluid flow. Concentric and integral with male and female race rings of the fluid swivel joint are a plurality of seal rings separated from the bearing rings by means of webs. The webs include a plurality of holes in a concentric pattern around a bore to form the concentric paths for fluid flow. Seals and the seal rings separate the bore from the concentric passage fluid flow paths.

17 Claims, 5 Drawing Figures

PATENTED OCT 1 1974

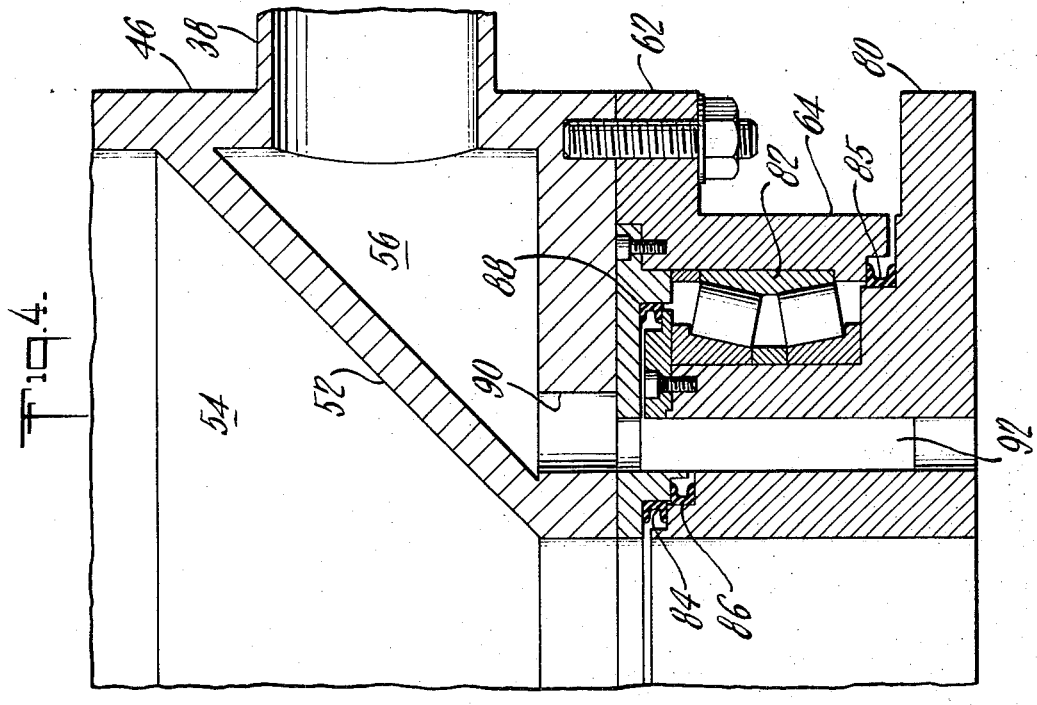
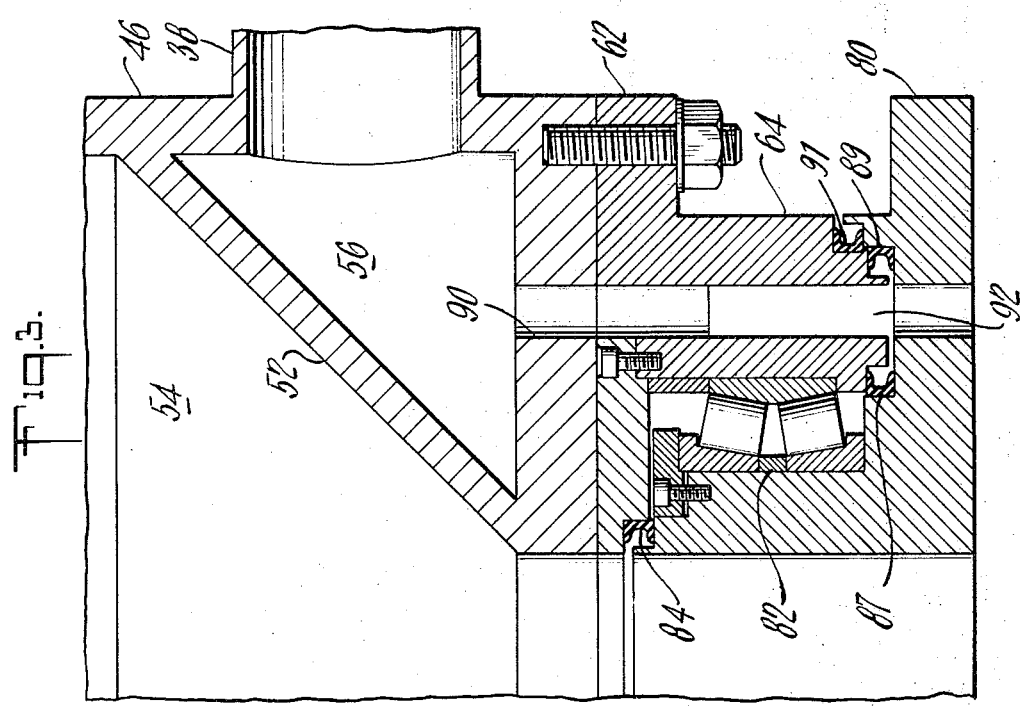

MULTI-PRODUCT SWIVEL JOINT

BACKGROUND OF THE INVENTION

In the past, there have been provided a variety of moorings including single anchor leg moorings which have proven to be safe, reliable and economical means for loading crude oil to large tankers. Typical prior art single anchor leg moorings are disclosed in U.S. Pat. Nos. 3,641,602 and 3,708,811, assigned to the assignee of the present invention. As disclosed in these patents, the moorings are capable of loading or offloading only one cargo at a time. The need to deballast large tankers at crude loading ports and the desire to bunker tankers or to load several products simultaneously provides the need for the development of a multi-product swivel for use with these moorings.

Basically, the fluid swivel assembly of the single anchor mooring comprises a load bearing center shaft surrounded by a rotating fluid swivel housing mounted on a fluid swivel joint, such as described and disclosed in U.S. Pat. No. 3,606,397, and provides only a single fluid flow path. Two such fluid swivel housings could be arranged one on top of the other; however, such a design would require three fluid swivel joints and the required length of the load bearing center shaft would be excessive for many installations. The second fluid passage could be concentric with and outside the shaft using conventional fluid swivel joints; however, this design would require two concentric joints where maintaining the outer concentricity of the assembled joints would be a problem and concentric joint would have to be extremely large in diameter.

In the prior art a number of multi-product cargo swivel designs have been proposed and used in single point mooring systems where maintenance can be performed frequently and where no load carrying center shaft is required. Typical designs are disclosed in U.S. Pat. Nos. 3,077,615; 3,082,440; 3,187,355; 3,237,220; 3,258,793; 3,261,039; 3,264,662; and 3,586,352. These designs fall into two general categories as follows.

The first category, typified by U.S. Pat. No. 3,082,440, features a series of vertically stacked product flow chambers with seals and bearings between adjacent chambers. In such a design it is difficult to assure alignment of the seals and bearings, thus causing excessive wear and a need for frequent maintenance and adjustment. This arrangement results in a very tall assembly which is not capable of withstanding a large lateral load without excessive deformation and stressing of the bearings and seals.

The second category, typified by U.S. Pat. No. 3,077,615, features a series of concentric product flow chambers separated by seals and bearings of progressively larger diameter. It is even more difficult to maintain alignment of the seals and bearings in this design than in the previously described design. Furthermore, the outer bearings and seals are very large and are difficult and expensive to machine and manufacture. Although multi-product cargo swivel designs such as those described above may be suitable for use on conventional single point mooring buoys, they are not suitable for use in a single anchor leg mooring system.

The present invention provides a multi-product swivel assembly suitable for use in a single anchor leg mooring system, which includes a load carrying center shaft capable of withstanding substantial lateral and axial loads without excessive deflection which cause loading of the bearings and seals and result in bearing or seal damage and means for assuring accurate alignment of the bearings and seals such that periodic maintenance is not required.

SUMMARY OF THE INVENTION

The present invention relates in general to moorings and more particularly, to a novel multi-product swivel joint preferably for use in a single anchor leg mooring. Such a swivel joint comprises male and female bearing rings with fluid seals arranged in the manner of a conventional fluid swivel joint. The joint is unique in that the male and female bearing rings have auxiliary seal rings concentric and integral with the bearing rings. These seal rings are connected to the bearing rings by means of webs which are pierced by a number of fluid passages in a concentric pattern about a bore. In the assembled fluid swivel joint and space between the webs and the fluid passages through the web provide a fluid flow path concentric with the internal bore of the joint. A space between the male and female webs is provided so that fluid flow can take place when the male and female rings are rotated to a point where the fluid passages are not in line.

A multi-product swivel constructed according to the present invention is very versatile in that it has a multiplicity of applications. The swivel may be used as a loading terminal for crude oil for on-land or off-shore oil fields, as a discharge terminal for crude oil input to refineries, as well as serving for the bunkering of all types of vessels. As a combined loading and discharging terminal, it has utility where crude oil is discharged and refined products are loaded simultaneously, and also has utility for the handling of refined products only, cryogenics, and the handling of solid in slurry form. In addition, it also can handle unusual cargoes in fluid form such as asphalt, etc.

Accordingly, it is a primary object of the present invention to provide an improved and novel swivel joint for a mooring system, capable of handling multiple products simultaneously.

It is a further object of the present invention to provide a novel and improved multi-product fluid swivel assembly that has particular utility in a single anchor leg mooring.

Having in mind the above and other objects and advantages that will be apparent from an understanding of this disclosure, the present invention comprises the combinations and arrangements as illustrated in the presently preferred embodiments of this invention, which is hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 3 illustrates a partial cross-sectional view of the multi-product swivel of FIG. 2 having product passages external to the bearing;

FIG. 4 illustrates a partial cross-sectional view of the multi-product swivel of FIG. 2 having product passages internal to the bearing.

DESCRIPTION OF THE PREFERRED EMBODIMENTS

Figure 1:
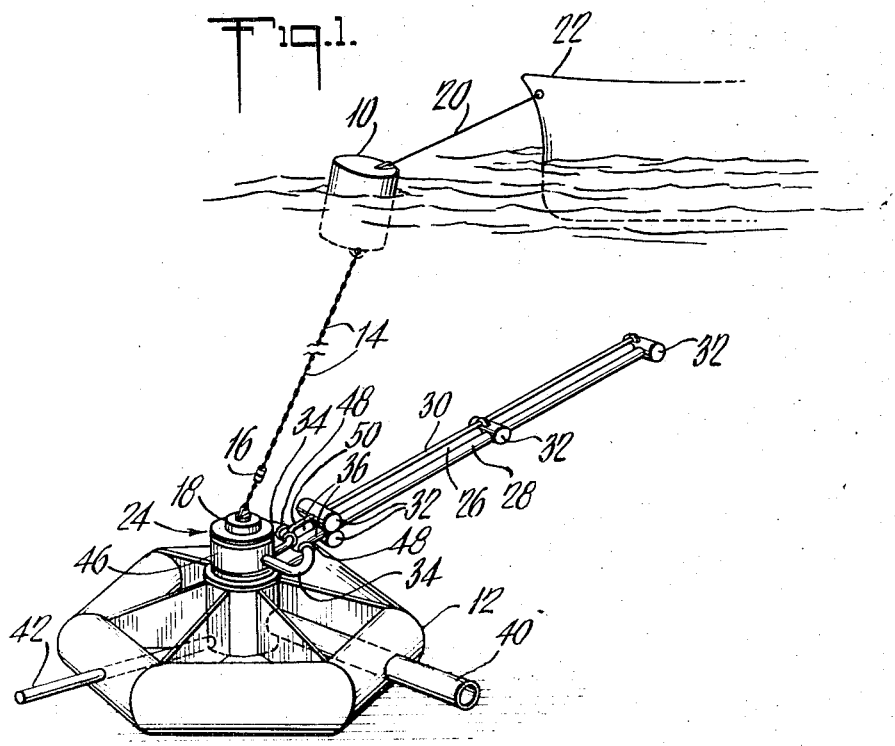
FIG. 1 discloses a multi-product swivel constructed according to the present invention as part of a single anchor leg mooring.

Having reference to the drawings wherein like parts are designated by the same reference numerals throughout the several views, the present invention is illustrated in FIG. 1 as embodied in a single anchor leg mooring such as disclosed in U.S. Pat. No. 3,708,811. While in its preferred form the multi-product swivel is disclosed in a specific single anchor leg mooring, it is within the scope of this invention for the multi-product swivel to be incorporated into a variety of different types of single anchor leg moorings as well as other types of single point moorings (e.g., multiple catenary anchor leg type). As illustrated, the single anchor leg mooring comprises a mooring buoy 10 connected to a suitable mooring base 12 through a single anchor leg. This anchor leg comprises an anchor chain 14 connected at one end to the underside of the buoy 10 and at its other end to an anchor swivel 16 which in turn is connected to the load-carrying shaft 18 of the swivel assembly. The anchor swivel 16 permits relative rotation between the buoy 10 and the shaft 18. Thiss shaft 18 comprises the load-carrying member of the single anchor leg and receives the force applied by the moored tanker 22 via the mooring line 20, the mooring buoy 10, the anchor chain 14 and the anchor swivel 16, for transmission to the mooring base 12 anchored to the sea bottom. The multi-product swivel assembly constructed according to this invention is generally designated 24 (see FIG. 1). To facilitate the transfer of cargo as previously discussed, the mooring is provided with a pair of first product hoses 26 and 28 and a second product hose 30. These hoses are connected together for movement in unison by means of buoyancy tanks 32 spaced along the length thereof. The first product hoses 26 and 28 are connected to the multi-product swivel 24 by means of first product lines or elbows 34 and 36, while the second product hose 30 is connected to the swivel via second product lines or elbows 38, 39. As shown in FIG. 1, a first product pipeline 40 and a second product pipeline 42 are connected to the mooring base 12. The fluid flows between the multi-product swivel 24 and the product pipelines 40 and 42 through piping in the base. These pipelines may terminate at their opposite ends at a shore terminal or some suitable offshore cargo storage terminal.

The multi-product swivel assembly constructed according to this invention comprises a swivel unit which incorporates inner and outer concentric fluid passages in a single body. This concentric passage fluid swivel joint is smaller in design to conventional fluid swivel joints in that it comprises a stationary ring and a rotating ring separated by bearings and seals.

Figure 2:
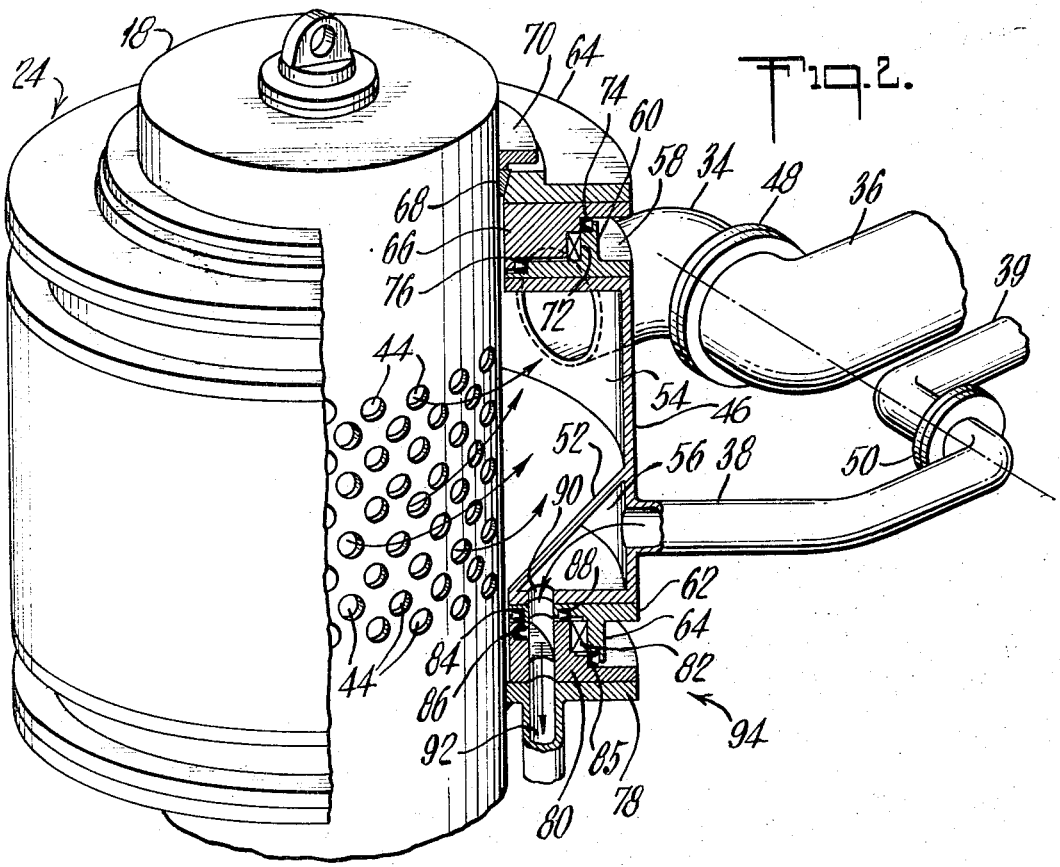
FIG. 2 illustrates a perspective cut-away view of the multi-product swivel of FIG. 1.

As shown in FIG. 2, the swivel assembly 24 comprises the stationary centrally disposed load-carrying shaft 18 which is integral with the mooring base 12 and is connected through piping in the base to pipeline 40. This shaft is hollow and is perforated about its periphery with a plurality of spaced openings 44 at predetermined axial locations which provide fluid passages for the cargo flowing through this primary conduit. A rotatable swivel housing 46 is mounted around the shaft 18. The first product hoses 26, 28 and second product hose 30 are connected via swivels 48, 50, and elbows 34 and 36, and 38 and 39 respectively to the swivel housing 46. The housing 46 and the shaft 18 form an annular chamber 54 for the flow of product between the openings 44 and the elbows 34 and 36. A conical housing divider plate 52 forms a lower chamber 56 within the housing, which is in fluid communication with the elbows 38, 39 and holes 90 in the bottom of the housing.

Secured by nuts and bolts (not shown) at the top of the housing 46 is an upper rotatable flange 58 having an upward extending cylindrical lip 60 located radially inward from the periphery of the housing 46.

Situated above the rotatable flange 58 is an upper stationary stepped bearing and seal mounting flange 66 secured via nuts and volts (not shown) to the underside of a top plate 64. A stationary annular tapered compression seal 68 is provided between the inner periphery of the top plate 64 and the shaft 18. This seal 68 is held in place by a compression seal ring 70 suitably secured to the top plate 64. Movement between the rotatable housing 46 and the stationary top plate 64 and shaft 18 is facilitated by means of the roller bearing 72 located between the cylindrical lip 60 of rotatable flange 58 and stationary flange 66. An external fluid seal 74 and an internal seal 76 are also provided between the stationary and rotating parts of the swivel. At the bottom of the housing 46 there is secured a lower rotatable flange 62 secured by nuts and bolts (not shown). This plate 62 also is provided with a cylindrical lip 64 extending in a downward direction. Below the rotatable flange 62, there are provided a base stationary plate 78 and a lower stationary stepped bearing and seal mounting flange 80, secured together by nuts and bolts (not shown). The base plate 78 may be suitably secured to the shaft 18, such as by welding, or may be machined as an integral part of the shaft. A roller bearing 82 is provided between the rotatable flange 64 and the stationary flange 80, and outer fluid seals 85, 88, and inner seals 84, 86 are provided to maintain the relatively rotatable parts in fluid tight relation. As discussed above, the chamber 56 is in fluid communication with the second product hose 30. The bottom of this chamber, which is the bottom of the housing 46, is provided with a series of circumferentially spaced openings 90. These openings in conjunction with corresponding openings formed in the flanges 62 and 80 and the base plate 78 provide a secondary passage or conduit 92 which is concentric with and external to the inner primary conduit or passage formed by the shaft 18. This secondary passage 92 is connected through piping in the base to the pipeline 42.

Details of two possible arrangements of the concentric passage fluid swivel joint are shown in FIGS. 3 and 4. In FIG. 3 the secondary passage 92 is external to the bearing 82. This design permits utilization of a small diameter bearing. Interior seal 84 prevents passage of product from the central passage to the bearing cavity and outward to the radially spaced passage 92. Interior seal 87 prevents passage of product from passage 92 to the bearing cavity while interior seal 89 on the opposite side of passage 92, prevents leakage of product from the passage, and exterior seal 91 prevents passage of water and foreign bodies into the radially spaced passage 92. In FIG. 4 the secondary passage 92 is internal to the bearing 82, as in FIG. 2. The seals in this design serve functions similar to those discussed in the design of FIG. 3.

The advantages obtained by combining the two fluid passages in one body are first that the stationary flange 80 and the rotating flange 62 are integrated into a single piece, including the inner and outer seal surfaces and the bearing support surfaces. This allows sealing surfaces and bearing support surfaces to be machined accurately without misalignment and simplifies manufacturing as well as insuring proper sealing and long seal life. The bearings and seals are combined together in a single body with external mounting flanges, which allows the entire unit to be factory assembled and also to be easily installed and removed in the field.

While FIG. 3 illustrates the use of a double tapered roller bearing, a crossed roller bearing design also may be used. Although not limited to roller bearings, by employing roller bearings instead of ball bearings higher tolerances can be maintained and loads are distributed over larger surface areas. With regard to the seals, the moving seals preferably are spring-loaded pressure seals made of low friction material such as Teflon. The sealing surfaces for the moving seals and "O" ring seals may be surfaced with corrosive resistant metals such as monel. This will provide satisfactory long-time salt water service.

The two-product cargo swivel assembly shown in FIGS. 1 through 4 functions as follows. The cargo, e.g., crude oil, flows from the pipeline 40 through piping in the base and up the stationary hollow center shaft 18 passing through the center of the two-product swivel. The cargo then passes through the holes 44 provided in the shaft to the rotatable housing upper distribution chamber 54, and tout through elbows 34, swivels 48 and hose arm piping 36 to the hoses 26, 28. In the two-product swivel, the secondary pipeline 42 operably connects with piping in the base which enters a distribution chamber (not shown) beneath the lower swivel designated generally at 94 and concentric with the center shaft 18. Fluid in this distribution chamber passes through the secondary passages 92 in the lower swivel 94 to the lower chamber 56 of the housing 46, which is separated from the upper chamber by the divider plate 52. Elbow 38 leads from the lower chamber through the fluid swivel joint 50 to small diameter piping comprising hose arm 39 and on to small diameter hose 30. Thus, bunker fuel may be carried through the secondary flow conduit of the two-product fluid swivel assembly as shown in FIG. 2. Typically, the system may include a 12 inch conduit which may be connected by 12 inch hoses to the bunker manifold of a moored tanker. Bunkering may take place simultaneously with loading or discharging of crude oil or some other cargo. Other embodiments which are possible are the employment of a larger diameter secondary conduit which is suitable for simultaneous deballasting. This conduit would branch into two smaller swivels on the housing, which swivels connect with the lower portion of the housing which rests on a modified concentric passage fluid swivel joint having the bearing external to the larger concentric passage.

As disclosed in the previously discussed patents, the purpose of the load-carrying center shaft is to withstand large tension and bending loads imposed on an anchoring point at the top of the shaft by moored tankers. This shaft does not deflect enough to interfere with the alignment of the fluid swivel joints and none of the mooring load is transmitted through the bearings of the fluid swivel joints.

Figure 5:
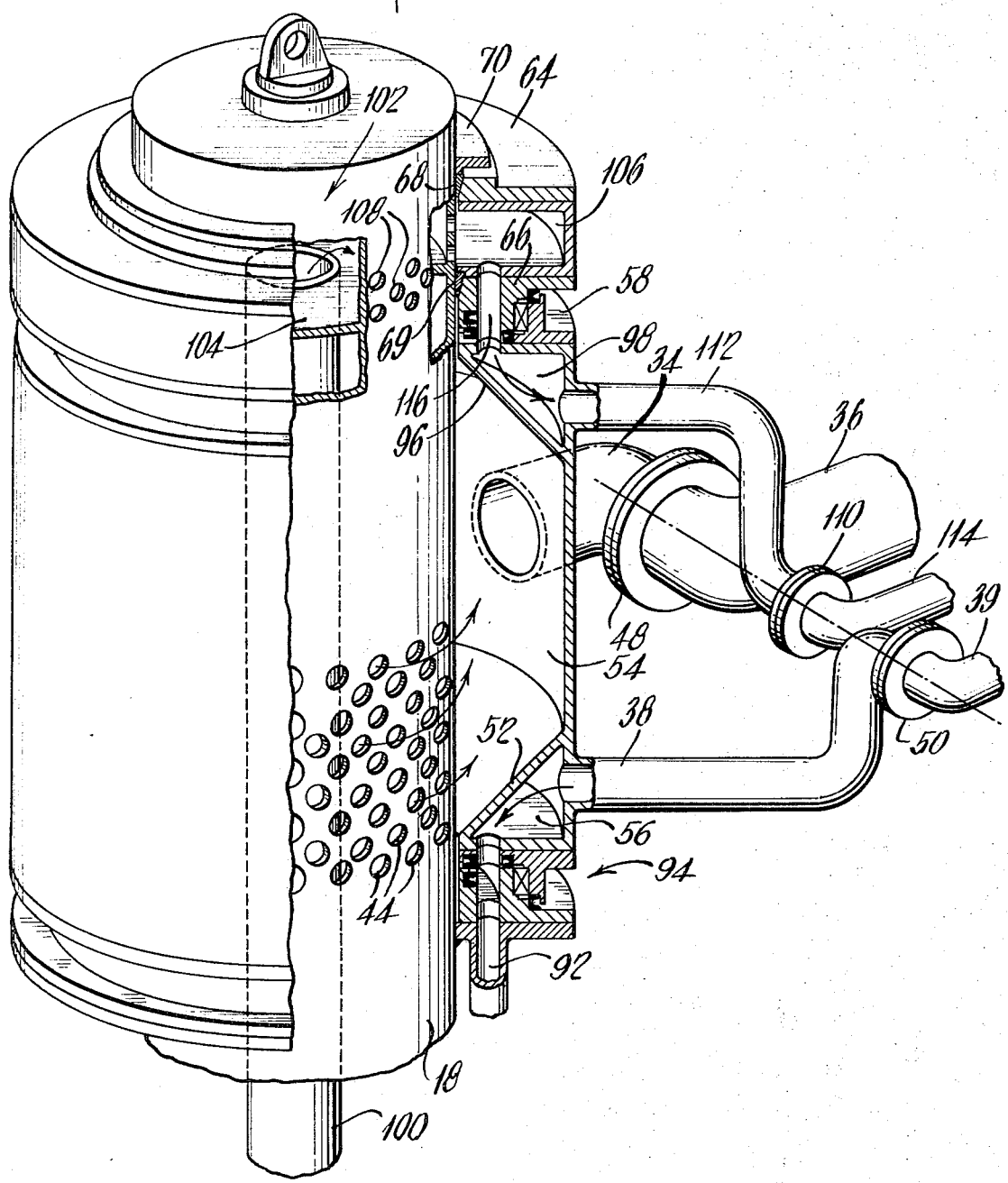
FIG. 5 illustrates a perspective view of another embodiment of the multi-product swivel having three-product flow capability.

FIG. 5 discloses a modification of the multi-product swivel which permits simultaneous handling of a third product. As illustrated, the upper portion of the housing 46 is separated from the central chamber of the housing by means of an upper conical divider plate 96, which forms an upper chamber 98 for handling the third product. Appropriate piping 100 extends through the center shaft 18 from the mooring base 12 to an upper shaft chamber 102 formed by annular plate 104 and the top of shaft 18. This chamber is in fluid communication with an outer upper housing chamber 106 by means of openings 108 provided at the top of shaft 18 and located axially upward from openings 44 which form part of the primary flow passage. A low seal 69 around the shaft separates the two flow paths. An additional swivel 110 and further elbow piping 112 connects the upper chamber 98 of the housing to the hose arm 114. The chambers 98 and 106 are connected for cargo transfer in a manner similar to secondary passage 92, via a tertiary passage 116. With such a multi-product swivel a third fluid flow path is provided for the mooring.

In operation, the third product enters through the pipe 100 in the center of the load-carrying shaft 18. The top of the shaft 18 is divided by the bulkhead 104 to form the chamber 102 for the third product. This third product flows through the holes 108 to an external stationary chamber 106 above the rotatable housing 46. From there the third product flows downward through a special swivel unit identical to the lower swivel unit to the rotatable upper chamber 98 in the housing. Piping from the housing 46 leads to a third horizontal swivel 110 coaxial with the other horizontal swivels 48 and 50. This coaxial arrangement of the swivels permits the hose arms to pivot up and down.

It will be appreciated from the foregoing description that there has been provided a unique multi-product swivel joint that has particular and preferred utility in a single anchor leg mooring. It should be understood, however, that the constructions and arrangements herein illustrated and described are intended to be representative only of preferred embodiments and that various changes readily may be made therein without departing from the clear teachings and scope of the present invention. Accordingly, reference should be made to the following appended claims in determining the full scope of this invention.

Having thus set forth the nature of the invention, what we claim herein is:

1. In a single anchor leg mooring system for mooring a tanker at sea, comprising a mooring buoy located at the surface of the sea for receiving a mooring load, a base anchored to the sea bottom, a single anchor leg connected to said buoy and said base comprising an anchor chain, an anchor swivel and a mooring load-carrying shaft, and a swivel assembly located between said base and said buoy below the surface of the sea, said swivel assembly operably associated with said shaft for aiding in the transfer of cargo between said base and said tanker when it is moored to said buoy, wherein the improvement comprises:

said swivel assembly being capable of handling multi-product flow and comprising a plurality of radially spaced passages each for handling separate product flow, including a first product flow passageway formed by said load-carrying shaft having a plurality of spaced openings in the peripheral wall thereof and at least a second product flow passageway radially spaced from said first passageway, a rotatable swivel housing spaced radially outward from said first and second passageways and constructed and arranged to provide at least two separate chambers disposed vertically adjacent each other and concentric with said load-carrying shaft for handling the product flow from said first and second passagways respectively, each of said chamber having an opening in the outer radial wall thereof for connection with product conduit means to provide product flow communication between said conduit means and said chambers, one of said chambers being directly adjacent said load-carrying shaft in product flow communication therewith via said openings, bearing means enabling relative rotation between said load-carrying shaft and said rotatable swivel housing, and a plurality of seal means radially spaced at different distances relative to said peripheral wall of said shaft for separating the product flow through each of said first and second passageways from each other and from contamination by the surrounding sea and for preventing passage of product from said passageways to said bearing means respectively.

2. The multi-product swivel assembly of claim 1 wherein said second passageway is located externally of said first passageway.

3. The multi-product swivel assembly of claim 2 including external seal means for confining flow within said second passageway.

4. The multi-product swivel assembly of claim 3 wherein said second passageway is located external to said bearing means.

5. The multi-product swivel assembly of claim 4 wherein said seal means includes internal seal means which comprises first seal means disposed internally of said bearing means and second seal means disposed externally of said bearing means for separating said bearing means from said first and second passageways respectively, and said external seal means comprises third seal means disposed externally of said second passageway for confining flow within said second passageway.

6. The multi-product swivel assembly of claim 2 wherein said second passageway is located internally of said bearing means.

7. The multi-product swivel assembly of claim 6 wherein said seal means includes internal seal means which comprises first seal means disposed internally of said second passageway for separating said first and second passageways, and external seal means which comprises second seal means disposed externally of said second passageway for separating said bearing means from said second passageway, and third seal means disposed externally of said bearing means for preventing entry of foreign material into said bearing means.

8. The multi-product swivel assembly of claim 2 including a third product flow passageway located internally of said load-carrying shaft and a third chamber in said swivel housing separate from and disposed vertically adjacent one of said first and second chambers for handling product flow from said third passageway.

9. The multi-product swivel assembly of claim 8 wherein said first chamber is in fluid communication with said load-carrying shaft and said second and third chambers are disposed vertically adjacent below and above said first chamber respectively and are fluidly sealed therefrom.

10. The multi-product swivel assembly of claim 9 wherein said load-carrying shaft includes a second plurality of openings in the peripheral wall thereof spaced axially of said first plurality of openings, said second plurality of openings providing product flow communication between said third chamber and said third product flow passageway.

11. The multi-product swivel assembly of claim 1 wherein said second passageway is located externally of said load-carrying shaft.

12. The multi-product swivel of claim 11 wherein said swivel housing includes a stationary lower housing plate having a least one opening therein for providing product flow communication between said second passageway and an adjacent one of said first and second chambers, and said at least one opening being radially spaced from said load-carrying shaft.

13. The multi-product swivel of claim 11 having a cavity concentric with said load-carrying shaft and radially spaced therefrom at substantially the same distance as said opening in said lower housing plate, said cavity providing a through path for product flow between said opening in said lower housing plate and said second passageway at any position of relative rotation between said swivel housing and said stationary plate.

14. The multi-product swivel of claim 13 including a second seal means mating with surfaces of said rotatable swivel housing and said lower housing stationary plate and located internal with respect to said cavity.

15. The multi-product swivel of claim 13 including a second seal means mating with surfaces of said rotatable swivel housing and said lower housing stationary plate and located external with respect to said cavity.

16. A multi-product swivel assembly for use in a mooring system for mooring tankers offshore, comprising at least first and second radially spaced passages for product flow therethrough; a centrally located rigid load-bearing shaft having a longitudinal axis and adapted for receiving substantially the entire mooring load from a tanker moored to said system and capable of carrying product therethrough and comprising one of said first and second passages; a plurality of spaced openings in the peripheral wall of said rigid load-bearing shaft; a rotatable swivel housing concentric with said longitudinal axis of said rigid load-bearing shaft and located externally of said shaft directly adjacent thereto; said rotatable swivel housing including a plurality of separate vertically disposed adjacent chambers each being concentric with said rigid load-bearing shaft and having product pass therethrough, at least one of said chambers being in direct product flow communication with said rigid load-bearing shaft via said openings; a conduit, comprising the other of said first and second passages, for the passage of product therethrough in product flow communication with a second one of said chambers and located radially outward of said rigid load-bearing shaft; each of said chambers having an opening in the outer radial wall thereof for having connected thereto conduit means for the transfer of product between the tanker moored to said system and said swivel assembly.

17. The multi-product swivel assembly of claim 16 wherein said rigid load-bearing shaft is substantially unobstructed internally in a circumferential direction.

* * * * *